United States Patent Office 3,005,820
Patented Oct. 24, 1961

3,005,820
PROCESS FOR MAKING PYRAZINE AND ALKYLPYRAZINES
Moses Cenker, Trenton, and George E. Baxter, Wyandotte, Mich., assignors to Wyandotte Chemicals Corporation, Wyandotte, Mich., a corporation of Michigan
No Drawing. Filed Nov. 17, 1958, Ser. No. 774,163
9 Claims. (Cl. 260—250)

This invention relates to a new and improved catalytic process for making pyrazine and alkylpyrazines. In a more specific aspect, this invention relates to an improved catalytic method for dehydrogenating piperazine and lower alkyl-substituted piperazines to pyrazine and the corresponding lower alkyl-substituted pyrazines.

Pyrazine and alkyl-substituted pyrazines, such as methylpyrazine, ethylpyrazine and tetramethylpyrazine, are known compounds whose chemical and physical properties make them of interest as intermediates in the preparation of rubber accelerators, condensation polymers, pharmaceuticals and dyestuffs. Pyrazine is employed as a raw material for the manufacture of aminopyrazines and ultimately sulfanilamidopyrazines which have been found to be of commercial importance in the field of chemotherapy. Pyrazine and the alkyl-substituted pyrazines are, thus, industrial chemicals of importance. Surprisingly, however, the published processes for making pyrazine and the alkyl-substituted pyrazines by dehydrogenating piperazine or the corresponding alkyl-substituted piperazine leave much to be desired from a practical, commercial viewpoint. The disadvantages in all of the published processes for making pyrazines by dehydrogenating piperazines include one or more of such basic faults and disadvantages as low conversion to pyrazines, short catalyst life and high reaction temperatures.

Thus, Dixon in U.S. 2,400,398 discloses that piperazine was dehydrogenated over a catalyst specified simply as "copper chromite" at 215–500° C., noting that the optimum temperature for best results was between about 400–475° C. Dixon reports conversions of piperazine to pyrazine of 35–45% in a single pass. The Dixon patent refers to a chart illustrating the conversions which shows that the longest runs carried out by Dixon were about 4–6 hours in length. In any event, the Dixon disclosure points up the disadvantages in his process in noting that the highest conversions obtainable are about 45% based on runs of, at most, about 6 hours in length. Furthermore, any process which is preferably carried out at such high temperatures as about 400–475° C. requires special heat transfer media which is a disadvantage. Operation at lower temperatures with high single pass conversion of starting material and long catalyst life is not provided by the process of the Dixon disclosure.

A disclosure of a similar process for dehydrogenating piperazine to pyrazine is given in British Patent No. 609,924 which reports that piperazine was dehydrogenated to pyrazine at temperatures between about 250–550° C. British 609,924 discloses that the catalyst can be an oxide of copper, nickel, zinc or cadmium employed separately or together with one another or with chromium oxide. The runs reported in British 609,924 provided conversions of 30–40%, which are undesirably low, and, furthermore, very low feed rates of the piperazine per gram of catalyst were used. Such low conversions and low feed rates are disadvantages which mean that the process of British 609,924 is not one which is ready for adaptation to a commercial scale on a profitable basis.

The process of the Dixon patent, to which reference was made, was adapted to the dehydrogenation of 2-methylpiperazine to produce methylpyrazine by Kitchen and Hanson in Journal of the American Chemical Society, vol. 73, page 1838 (1951) wherein a copper chromite catalyst supported on activated alumina was employed. Kitchen and Hanson conducted the process at about 475° C. and a conversion of 35–45% 2-methylpiperazine to methylpyrazine was obtained. The feed rate employed by Kitchen and Hanson is not disclosed but operation at such high temperatures and with such low conversions are disadvantages which prevent their process from being readily adapted to profitable commercial operation. In spite of the several processes which have been reported, there is a complete lack of a reported process which permits the dehydrogenation of piperazines to pyrazines with high conversions in a single pass operation at reasonably low temperatures and at desirably high feed rates per unit of catalyst.

It is an object of this invention, therefore, to provide an improved process for dehydrogenating a piperazine or a lower alkyl-substituted piperazine to a pyrazine or the corresponding lower alkyl-substituted pyrazine.

It is a further object to provide an improved process for making pyrazine or alkyl-substituted pyrazines in high conversions in a single pass over a catalyst.

It is a still further object to provide a process for making pyrazine and lower alkyl-substituted pyrazines wherein the optimum operating temperature is lower and the optimum feed rate of starting material per unit of catalyst is higher than have been employed in the processes disclosed heretofore.

A still further object is to provide a process for making pyrazine and alkyl-substituted pyrazines by employing a catalyst which exhibits a long catalyst life thereby extending the time between regenerations of the catalyst.

We have discovered that all of the foregoing objectives, and others, which will become apparent from study of the disclosure and examples to follow, are achieved in a process for dehydrogenating piperazine and lower-alkyl-substituted piperazines to pyrazine and the corresponding lower alkyl-substituted pyrazines which comprises passing the piperazine starting material in vapor phase over a heated, reduced form of a copper chromite catalyst having specially prescribed amounts of copper oxide (CuO) and chromium oxide ($Cr_2O_3$) at temperatures in the range of about 300–375° C. This process provides conversions of about 80% to the pyrazine product in a single pass and the special catalyst employed in this process has a remarkably long life which results in an over-all conversion which is substantially and remarkably higher than the conversions obtained in the processes reported heretofore. For example, a run has been carried out for 345 hours continuously dehydrogenating 2-methylpiperazine to methylpyrazine and the over-all conversion for the entire run was 68% to methylpyrazine. Several runs have been made with the process of the invention using the special copper chromite catalyst wherein conversions of up to 89% to the corresponding pyrazine compound were obtained and yields of up to 91% resulted.

It will be apparent from the foregoing that the most important feature of the new process is the special copper chromite catalyst with which such excellent results have been obtained. The combination of this special copper chromite catalyst and the lower temperatures at which high conversions and yields in single pass operation can be achieved are the essential features which distinguish this process from the processes heretofore published.

The copper chromite catalyst which is employed in the process is one which, broadly speaking, consists essentially of about 40–85 weight percent CuO and about 60–15 weight percent $Cr_2O_3$. The catalyst having this composition must be reduced by treatment with hydrogen gas under carefully controlled temperature conditions before use, since use of the catalyst composition to dehydrogenate a piperazine without first reducing the catalyst results in an uncontrollable exothermic reaction. Desirably, the catalyst is pilled and used in a fixed bed operation although the catalyst can be used in powder form in a fluid bed system. The catalyst can be deposited on a support so long as the support is inert and chemically neutral. Pilling of the $CuO$-$Cr_2O_3$ catalyst is difficult to accomplish when compositions having CuO contents in the lower reaches of the 40–85 weight percent range are used and, for this reason, catalyst compositions consisting essentially of 75–85 weight percent CuO and 25–15 weight percent $Cr_2O_3$ are preferred. Strong pellets can be prepared from such compositions and can be used in a fixed bed operation with regeneration by an oxidation-reduction procedure when the activity has fallen off. The exceptionally long life of the catalyst in the process of the invention is one of the most important attributes of the process, however.

The catalyst used in the process of the invention is one which "consists essentially" of CuO and $Cr_2O_3$ in stated proportions. Thus, the catalyst composition can contain such impurities as are customarily associated with a $CuO$-$Cr_2O_3$ mixture but must not contain any other ingredient which would alter the chemical neutrality of the catalyst. Surprisingly, it has been found that the presence of even small quantities of conventional, but alkaline, binding agents, such as sodium silicate, or acidic binding agents, such as aluminum phosphate, are very harmful to the activity of the catalyst in the process of the invention. Furthermore, a known additive for enhancing the activity of a $CuO$-$Cr_2O_3$ catalyst is BaO, but it has been found that the presence of BaO in a $CuO$-$Cr_2O_3$ catalyst mixture is very harmful to the activity of the catalyst in the process of dehydrogenating a piperazine to a pyrazine. Thus, the catalyst used in the process of the invention must be a reduced, neutral form of a $CuO$-$Cr_2O_3$ composition in the proportions stated above.

The copper chromite catalyst which we have employed in several of the examples which follow is commercially available from Harshaw Chemical Company and is identified by the supplier as "Cu 0203T1/8." The Cu 0203 copper chromite catalyst contains about 80 weight percent CuO, 18 weight percent $Cr_2O_3$ and about 2 weight percent graphite to aid in the pilling of the catalyst. This is the preferred catalyst since it has been found to exhibit a remarkably long life with high conversions at satisfactorily high feed rates of the piperazine per part of catalyst.

The temperature at which the process is carried out is important and, as indicated above, can be generally in the range of about 300–375° C. We have found that operation in the relatively narrow range of about 340–360° C. gives unusually high conversions and satisfactory catalyst life.

The piperazine starting material is passed over the heated copper chromite catalyst specified in the process of this invention at a rate of up to about 0.8 gram (anhydrous basis) per gram of catalyst per hour. The lower limit on the feed rate is controlled by economic factors and operation at higher feed rates results in some sacrifice in conversion and catalyst life. Higher feed rates are feasible when the piperazine starting material is employed in a molten, anhydrous state then when the piperazine starting material is dissolved in an inert solvent.

The pyrazines which can be produced by the process of the invention include pyrazine, itself, and the lower alkyl-substituted pyrazines. These pyrazine compounds are the pyrazines corresponding to the piperazine starting material which is dehydrogenated and the latter can be represented by the formula,

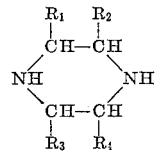

wherein $R_1$, $R_2$, $R_3$ and $R_4$ are hydrogen, methyl or ethyl radicals. Thus, pyrazine, methylpyrazine, ethylpyrazine, dimethylpyrazine, such as 2,6-dimethylpyrazine, and tetramethylpyrazine all can be obtained in high conversions by employing the corresponding piperazine as the starting material in the process of the invention.

The piperazine starting material can be employed in an anhydrous form or dissolved in an inert, liquid solvent, such as benzene or water. Saturated aqueous solutions of the piperazine starting material are usually easier to handle than the anhydrous piperazine compound since the piperazine starting material otherwise requires melting in order to flow into the reactor. When an aqueous solution of the piperazine is used, the solution usually contains from about 25–75 weight percent of the piperazine starting material.

The process of this invention is a vapor phase process and is carried out at about atmospheric pressure.

The terms "conversion" and "yield" used in this specification are defined as follows. Conversion is a measure of the percent of the feed piperazine reactant that is converted to the pyrazine product and conversion is calculated in accordance with the equation:

$$\text{Percent conversion} = \frac{\text{mols pyrazine product obtained}}{\text{mols piperazine starting material charged}} \times 100$$

Yield is calculated on the basis of the piperazine reactant actually consumed in the process in accordance with the equation:

$$\text{Percent yield} = \frac{(\text{mols pyrazine product obtained})}{(\text{mols piperazine charged}) - (\text{mols piperazine recovered})} \times 100$$

The following examples are supplied to illustrate the process of this invention and should not be employed to unduly restrict the invention in view of the disclosure of reactants, catalyst and conditions which have been set forth herein.

EXAMPLE I

The reactor system and procedure followed in all of the work reported herein was generally the same. The reactor was a 6-foot length of 1-inch pipe covered by a heated jacket. The temperature in the reactor was measured through a thermocouple well which was centered inside the pipe and extended the length of the pipe. Inert packing rings were positioned in the reactor at each end and the catalyst was placed between the two sections of inert packing rings. Thus, the inert packing rings served as a preheating section which insured the vaporization of the piperazine feed material. The reactor was fitted with the necessary feed system for liquids, inlet valves and a condenser system for collecting the product.

After charging the catalyst to the reactor, the catalyst was reduced before use. The reduction process consisted of passing nitrogen over the catalyst bed at a rate of 100 liters per hour while the catalyst bed was heated to 200° C. The heat input to the catalyst bed was then lowered and hydrogen, at a rate of 50 liters per hour, was added to the nitrogen flow. A high temperature spot then developed at the top of the catalyst bed and the temperature rose rapidly to about 300° C. at this zone of high temperature. The heat input was then further reduced and the nitrogen flow increased to 400 liters per hour. This gas mixture, 400 liters of nitrogen and 50–125 liters of hydrogen per hour, was then passed through the reactor for 2 hours while the zone of high temperature traveled down through the entire length of the catalyst bed. Adjustment of the hydrogen flow was made in order to maintain the temperature of the high temperature zone at about 300° C. After the high temperature zone had traveled the length of the catalyst bed, the catalyst bed was heated to a temperature of 300° C. and hydrogen gas was passed over the catalyst at a rate of 40 liters per hour for 3 hours to insure reduction of the catalyst.

When the catalyst bed had been reduced, the catalyst bed was then heated to the temperature at which the dehydrogenation of the piperazine starting material was to be carried out, such as about 350° C., the hydrogen flow was stopped and an aqueous solution of the piperazine starting material (or molten piperazine compound) was pumped into the reactor. The condensed effluent from the reactor was collected in samples representing, usually, 8–16 hours of operation. The percent conversion and yield was determined by flash distilling an aliquot of a product sample to separate the volatile materials from the 4–5% higher boiling residues in the crude product. Then, the distillate was analyzed for its piperazine and pyrazine compound content. The pyrazine product was isolated by diluting the reactor effluent with an equal volume of water and the water-pyrazine product azeotrope was distilled. The distillate was then treated with sodium hydroxide in order to layer out the pyrazine product which was then redistilled. Also, the piperazine starting material was separated from the residue of the initial product distillation after excess water was removed by distillation.

The catalyst was regenerated after a period of operation by steaming the catalyst bed for about 4 hours to remove tars. The catalyst bed was then oxidized by a process which was the same as the reduction process described above except that air was used instead of hydrogen. After so oxidizing the catalyst, the catalyst was reduced in the manner described above at which time the catalyst was then ready for use in the process of dehydrogenating a piperazine to a pyrazine.

A series of runs was carried out employing different piperazine starting materials and dehydrogenating them to the corresponding pyrazine products. These runs are summarized below in Table I. The catalyst used in each of these runs was the Cu 0203 copper chromite catalyst which is preferred in the process of this invention and which contains about 80 weight percent CuO, 18 weight percent $Cr_2O_3$ and about 2 weight percent graphite. The remarkably high conversions and yields obtainable in the process of this invention are all the more surprising and unexpected in view of high feed rates employed and the relatively long duration of some of the runs that were carried out.

*Table I*

| Starting Material | Feed Rate, grams of piperazine per gram of catalyst per hour | Temperature, ° C. | Duration of Run, hours | Product | Conversion, percent | Yield, percent |
|---|---|---|---|---|---|---|
| 60.5 wt. percent aqueous soln. of piperazine. | 0.08 | 360 | 22 | Pyrazine | 79 | 79 |
| 80.0 wt. percent aqueous soln. of 2-methylpiperazine. | 0.24 | 350 | 100 | Methylpyrazine | 81 | 88 |
| 74.0 wt. percent aqueous soln. of 2-ethylpiperazine. | 0.17 | 360 | 17 | Ethylpyrazine | 89 | 89 |
| 2,5-dimethylpiperazine (anhydrous) | 0.40 | 345 | 2.3 | 2,5-dimethylpyrazine | 75 | 89 |
| 49.0 wt. percent aqueous soln. of 2,6-dimethylpiperazine. | 0.13 | 355–360 | 40 | 2,6-dimethylpyrazine | 87 | 91 |
| 32.0 wt. percent aqueous soln. of 2,3,5,6-tetramethylpiperazine. | 0.08 | 350–360 | 60 | 2,3,5,6-tetramethylpyrazine | 85 | 85 |
| 76.0 wt. percent aqueous soln. of 2-ethylpiperazine. | 0.22 | 300–315 | 3 | Ethylpyrazine | 77 | 77 |
| 2-methylpiperazine (anhydrous) | 0.63 | 340–360 | [1] 1.8 | Methylpyrazine | 58 | 78 |

[1] Catalyst had been used 46.3 hours before this run.

It has been found that the catalyst employed in the process of this invention must consist essentially of the recited CuO and $Cr_2O_3$. By this it is meant that other compounds which are desirable constituents of CuO-containing dehydrogenation catalysts for other processes have been found to be undesirable in the catalyst used in this process. It has been found that use of such other catalyst compositions results in low over-all conversion to the pyrazine product, short catalyst life or a combination of both.

EXAMPLE II

A run was carried out for dehydrogenating 2-methylpiperazine to methylpyrazine following the procedure described in Example I but employing a reduced, neutral form of a catalyst consisting of 50 weight percent CuO and 50 weight percent $Cr_2O_3$. A 78% aqueous solution of 2-methylpiperazine was fed to the reactor at the rate of 0.25 gram 2-methylpiperazine (anhydrous basis) per gram of catalyst per hour and the temperature was maintained at about 365° C. The run continued for 84 hours and the over-all overage conversion to methylpyrazine was 74 percent and the yield was 89 percent.

EXAMPLE III

A run was carried out for dehydrogenating 2-methylpiperazine to methylpyrazine following the procedure described in Example I but employing a reduced, neutral form of a catalyst consisting of 40 weight percent CuO and 60 weight percent $Cr_2O_3$. A 78% solution of 2-methylpiperazine was fed to the reactor at the rate of 0.25 gram 2-methylpiperazine (anhydrous basis) per gram of catalyst per hour and the temperature was maintained at about 350° C. for the first 32 hours and at about 365° C. for the succeeding 34 hours. The over-all overage conversion for the 68 hours to methylpyrazine was 64.5% and the yield was 91.5%.

EXAMPLE IV

A series of runs was carried out with other catalyst compositions than those which are used in the process of the invention.

The runs which were made with the other catalyst compositions employed an aqueous solution of 2-methylpiperazine as the starting material and the procedure, including initial reduction of the catalyst and reactor system used, was the same as has been described in Example I. The reaction temperature was about 335–360° C. and the aqueous solution of 2-methylpiperazine was fed to the catalyst bed at about 0.23 gram per gram of catalyst per hour.

Comparison run A

The catalyst used consisted of 90 parts by weight of a $CuO$-$Cr_2O_3$ mixture containing 80 weight percent $CuO$ and 20 weight percent $Cr_2O_3$ and 10 parts by weight of sodium silicate. After 12 hours of operation the conversion of methylpyrazine was 71% and the yield was 83%. However, the conversion dropped rapidly and after 24 hours the conversion was 54% and after 35 hours the conversion was 39%. The conversion remained at this level, or about 38%, through 45 hours of operation.

This catalyst was then regenerated after which the run was continued for 15 hours. The conversion after 15 hours with the regenerated catalyst was only 64%. The catalyst was then again regenerated and the initial conversion after 12 hours of operation was 75%. However, the conversion fell rapidly, it being 48% after 14 hours of further operation and 39% after 23 hours of operation. Clearly, a copper chromite catalyst containing sodium silicate does not have the catalyst life nor provide the high conversions which are obtained when the catalyst consists essentially of $CuO$ and $Cr_2O_3$.

Comparison run B

A run was made for dehydrogenating 2-methylpiperazine to methylpyrazine which differed from Comparison run A only in that the catalyst used consisted of 98 parts by weight of a mixture of $CuO$ and $Cr_2O_3$ containing 80 weight percent $CuO$ and 20 weight percent $Cr_2O_3$ and 2 parts by weight of sodium silicate. After 18 hours of operation, the conversion to methylpyrazine had dropped to about 45%.

Comparison run C

Another run was made for dehydrogenating 2-methylpiperazine to methylpyrazine which differed from Comparison runs A and B only in that the catalyst used consisted of 94 parts by weight of a mixtur of $CuO$ and $Cr_2O_3$ which contained 80 weight percent of $CuO$ and 20 weight percent $Cr_2O_3$ and 6 parts by weight of sodium silicate. After 22 hours of operation the conversion to methylpyrazine had dropped to about 45%. This catalyst was regenerated and after 13 hours of operation with the regenerated catalyst the conversion had dropped to 55%.

Comparison run D

A run was carried out for dehydrogeating 2-methylpiperazine to methylpyrazine employing a catalyst which consisted of about 97 parts by weight of a mixture of $CuO$ and $Cr_2O_3$ containing 80 weight percent $CuO$ and 20 weight percent $Cr_2O_3$ and about 3 parts by weight of aluminum phosphate. The run was carried out at 360° C. feeding an aqueous solution of 2-methylpiperazine to the reactor system and following the procedure described in Example I. After 20 hours of operation the conversion was satisfactory, 81%, and the yield was 84%. After 64 hours of operation, the conversion had dropped to about 55%, but, most significantly, the yield had dropped from the initial 84% to 76%. In contrast, the yield obtained with a catalyst consisting essentially of $CuO$ and $Cr_2O_3$ remains constant at 85% or more. Furthermore, recovery of the product methylpyrazine was consistently lower when the catalyst containing about 3 weight percent aluminum phosphate was used indicating loss of volatile by-products. Also, the crude methylpyrazine product obtained using the catalyst containing about 3 weight percent aluminum phosphate contained undesirably large amounts of high boiling residues.

The catalyst containing about 3 weight percent aluminum phosphate was regenerated and the run was continued. Using the regenerated catalyst, the conversion dropped to about 41% after 87 hours of operation, but, most significantly, the yield declined from 84% to 75% over the same period of time. It was observed that the catalyst containing about 3 weight percent aluminum phosphate was more difficult to oxidize in the regeneration operation than was the catalyst consisting essentially of $CuO$ and $Cr_2O_3$ in that a longer time was required for the oxidation step. This was due to an increased amount of tar formation which resulted from the use of the catalyst containing about 3 weight percent aluminum phosphate.

Comparison run E

Another run was made which differed from Comparison run D only in that the catalyst consisted of 94 parts by weight of the $CuO$-$Cr_2O_3$ mixture and 6 parts by weight of aluminum phosphate. The conversion to methylpyrazine dropped to about 56% after 58 hours of operation but the yield also declined to 75%. Low recovery of products and the presence of high boiling residues in the product were observed as in the case with the catalyst containing about 3 weight percent aluminum phosphate.

Comparison run F

A run was carried out with the same materials and following the same procedure as that described above but employing a catalyst consisting of 50 weight percent $CuO$, 50 weight percent $Cr_2O_3$ and only a very small percentage of sodium silicate as a binder. It was immediately apparent that the catalyst containing even a very small amount of sodium silicate could not be used in the process satisfactorily since the conversion to methylpyrazine fell to 52% after only 4½ hours of operation.

This surprisingly harmful effect of the alkaline binding agent is clearly shown when the run described in Example II is compared to this run F. The run in Example II is directly comparable, differing only in that the catalyst used in the run in Example II contained no sodium silicate at all, and there was obtained a conversion of 74% and a yield of 89% for that 84-hour run.

Comparison run G

A second run was carried out wherein the catalyst consisted of 50 weight percent $CuO$, 40 weight percent $Cr_2O_3$, 10 weight percent $BaO$ and a small amount of sodium silicate as a binder. This catalyst was clearly unsatisfactory since conversion to methylpyrazine dropped to 47% after 17 hours of operation.

Comparison run H

A run was carried out wherein the catalyst contained a high percentage of $CuO$ and wherein the $CuO$-$Cr_2O_3$ catalyst was deposited on silica-alumina pellets. The catalyst contained 97.3 weight percent $CuO$ and 2.8 weight percent $Cr_2O_3$. This catalyst composition was deposited on silica-alumina pellets in an amount such that the pellets constituted 61.5 weight percent of the total catalyst mass. A 78.5 weight percent aqueous solution of 2-methylpiperazine was passed into the reactor at 100 milliliters per hour and the reactor contained 136 grams of the supported $CuO$-$Cr_2O_3$ catalyst. The run was carried out at 325° C. and methylpyrazine was obtained in a 26% conversion and a 55% yield.

It has been found that the process of this invention for dehydrogenating a piperazine to a corresponding pyrazine compound can be carried out with conversions of about 80% and yields of about 80–90% to the pyrazine compound providing that the catalyst employed consists essentially of $CuO$ and $Cr_2O_3$. Thus, the catalyst must be a neutral composition and should not be deposited on a support unless the support material is both inert and chemically neutral. When this catalyst composition is employed, the high conversions and yields demonstrated in the runs in Examples I, II, III and V are obtained. Furthermore, the catalyst is one which is easily regenerated by an oxidation-reduction procedure. The catalyst used in the process of this invention has the further desirable characteristic of maintaining its activity for a long period of time. Thus, the frequency for regeneration is diminished which is a great advantage when operating a commercial process. The long catalyst life that is exhibited by the catalyst used in the process of this invention is demonstrated in Example V below.

EXAMPLE V

A run was carried out wherein 2-methylpiperazine was dehydrogenated to methylpyrazine. The catalyst used consisted of 80 weight percent CuO, 18 weight percent $Cr_2O_3$ and 2 weight percent graphite which is the preferred catalyst for use in the process of the invention and was reduced before use in accordance with the procedure given in Example I. The 2-methylpiperazine starting material was employed as a 74 weight percent aqueous solution. The aqueous solution of 2-methylpiperazine was fed to the reactor at about 0.23 gram of 2-methylpiperazine per gram of catalyst per hour. The temperature of the catalyst bed was about 350° C. throughout the run. This run proceeded for a total of 345 hours and the over-all conversion to methylpyrazine was 68%. The catalyst was regenerated by complete oxidation and reduction three times during the course of this run. The over-all yield was about 89% for the total run. Two of the cycles of operation between regenerations of the catalyst were over 100 hours in length during which time the conversion to methylpyrazine was maintained at satisfactorily high levels.

Thus, it is believed that the process of this invention constitutes a substantial advance over the processes which have been reported heretofore for dehydrogenating a piperazine to a pyrazine.

Stated broadly, the process of this invention is one for producing pyrazines by heating, vaporizing and passing a piperazine at about atmospheric pressure and at 300–375° C. over a reduced copper chromite catalyst which consists essentially of about 40–85 weight percent CuO and about 60–15 weight percent $Cr_2O_3$.

What is claimed is:

1. A process for producing a pyrazine, which comprises, heating, vaporizing and passing a piperazine at the rate of about 0.08 to 0.8 gram per gram of catalyst per hour over a reduced, chemically neutral, copper chromite catalyst consisting essentially of about 40–85 weight percent CuO and about 60–15 weight percent $Cr_2O_3$ at a temperature of about 300–375° C. and at about atmospheric pressure, said piperazine corresponding to the formula,

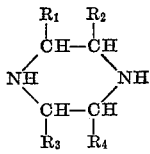

wherein $R_1$, $R_2$, $R_3$ and $R_4$ are members selected from the group consisting of hydrogen, methyl and ethyl radicals.

2. A process according to claim 1 wherein said temperature is in the range of 350–360° C.

3. A process according to claim 1 wherein said copper chromite catalyst consists essentially of about 75–85 weight percent CuO and about 25–15 weight percent $Cr_2O_3$.

4. A process for the production of pyrazine, which comprises, heating, vaporizing and passing piperazine at a rate of about 0.08 to 0.8 gram per gram of catalyst per hour over a reduced, chemically neutral, copper chromite catalyst consisting essentially of about 75–85 weight percent CuO and 25–15 weight percent $Cr_2O_3$ at a temperature of about 300–375° C. and at about atmospheric pressure.

5. A process for the production of methylpyrazine, which comprises, heating, vaporizing and passing 2-methylpiperazine at the rate of about 0.08 to 0.8 gram per gram of catalyst per hour over a reduced, chemically neutral, copper chromite catalyst consisting essentially of about 75–85 weight percent CuO and about 25–15 weight percent $Cr_2O_3$ at a temperature of about 300–375° C. and at about atmospheric pressure.

6. A process for the production of 2,5-dimethylpyrazine, which comprises, heating, vaporizing and passing 2,5-dimethylpiperazine at the rate of about 0.08 to 0.8 gram per gram of catalyst per hour over a reduced, chemically neutral, copper chromite catalyst consisting essentially of about 75–85 weight percent CuO and about 25–15 weight percent $Cr_2O_3$ at a temperature of about 300–375° C. and at about atmospheric pressure.

7. A process for the production of 2,6-dimethylpyrazine, which comprises, heating, vaporizing and passing 2,6-dimethylpiperazine at the rate of about 0.08 to 0.8 gram per gram of catalyst per hour over a reduced, chemically neutral copper chromite catalyst consisting essentially of about 75–85 weight percent CuO and about 25–15 weight percent $Cr_2O_3$ at a temperature of about 300–375° C. and at about atmospheric pressure.

8. A process for the production of 2,3,5,6-tetramethylpyrazine, which comprises, heating, vaporizing and passing 2,3,5,6-tetramethylpiperazine at the rate of about 0.08 to 0.8 gram per gram of catalyst per hour over a reduced, chemically neutral, copper chromite catalyst consisting essentially of about 75–85 weight percent CuO and about 25–15 weight percent $Cr_2O_3$ at a temperature of about 300–375° C. and at about atmospheric pressure.

9. A process for producing a pyrazine, which comprises, heating, vaporizing and passing a piperazine at the rate of about 0.08 to 0.8 gram per gram of catalyst per hour over a reduced, chemically neutral, copper chromite catalyst consisting essentially of about 80 weight percent CuO, about 18 weight percent $Cr_2O_3$ and about 2 weight percent graphite, to a temperature of about 350–360° C. and at about atmospheric pressure, said piperazine corresponding to the formula,

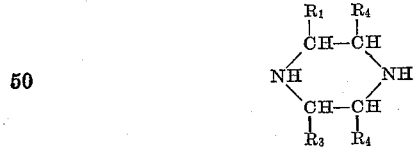

wherein $R_1$, $R_2$, $R_3$ and $R_4$ are members selected from the group consisting of hydrogen, methyl and ethyl radicals.

References Cited in the file of this patent

UNITED STATES PATENTS

| 2,400,398 | Dixon | May 14, 1946 |
| 2,474,782 | Dixon | June 28, 1949 |

FOREIGN PATENTS

| 609,924 | Great Britain | Oct. 8, 1948 |
| 466,652 | Canada | July 18, 1952 |

OTHER REFERENCES

Kitchen et al.: J. Amer. Chem. Soc., vol. 73 (1951), p. 1838.

UNITED STATES PATENT OFFICE
CERTIFICATE OF CORRECTION

Patent No. 3,005,820            October 24, 1961

Moses Cenker et al.

It is hereby certified that error appears in the above numbered patent requiring correction and that the said Letters Patent should read as corrected below.

Column 2, line 44, after "lower" strike out "the hyphen"; column 4, line 2, for "then" read -- than --; column 6, line 74, for "335" read -- 355 --; column 7, line 8, for "of" read -- to --; line 39, for "mixtur" read -- mixture --; line 48, for "dehydrogeating" read -- dehydrogenating --; column 10, line 47, right-hand portion of the formula, for "$R_4$" read -- $R_2$ --.

Signed and sealed this 10th day of April 1962.

(SEAL)
Attest:

ERNEST W. SWIDER            DAVID L. LADD

Attesting Officer            Commissioner of Patents